United States Patent [19]
Sonntag et al.

[11] Patent Number: 5,966,802
[45] Date of Patent: *Oct. 19, 1999

[54] DEVICE FOR ASSEMBLING A SYNCHRONIZER FOR A CHANGE-SPEED GEAR

[75] Inventors: Konrad Sonntag, Gmunden; Josef Zauner, Pettenbach; Christian Sandner, Gmunden, all of Austria

[73] Assignee: Miba Sintermetali Aktiengesellschaft Schaft, Laakirchen, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,532

[22] Filed: May 27, 1997

[30] Foreign Application Priority Data

Jun. 5, 1996 [AT] Austria ................... A 971/96

[51] Int. Cl.⁶ ................................. B23P 21/00
[52] U.S. Cl. ..................... 29/714; 29/407.08; 29/447; 29/252; 29/893.2
[58] Field of Search ............... 29/219, 226, 252, 29/267, 714, 893.1, 893.2, 407.08, 447

[56] References Cited

U.S. PATENT DOCUMENTS

| | | | |
|---|---|---|---|
| 5,416,966 | 5/1995 | Boerger, Jr. et al. | 29/407 |
| 5,511,300 | 4/1996 | Merz et al. | 29/407.08 |
| 5,613,289 | 3/1997 | Zauner | 29/407.08 |

FOREIGN PATENT DOCUMENTS

| | | | |
|---|---|---|---|
| 400615 | 6/1995 | Austria . | |
| 35 35 103 | 4/1987 | Germany . | |
| 57-71739 | 5/1982 | Japan | 29/714 |
| 58-116948 | 7/1983 | Japan | 29/252 |
| 1535-691 | 1/1990 | U.S.S.R. | 29/893.2 |

*Primary Examiner*—S. Thomas Hughes
*Assistant Examiner*—John Preta
*Attorney, Agent, or Firm*—Collard & Roe, P.C.

[57] ABSTRACT

A synchronizer for a gear change box comprising a hub, a sleeve axially slidable on the hub and a cone clutch comprising an inner friction ring axially coupled to the hub, an outer synchronizing ring axially displaceable relative to the inner friction ring by the sleeve, and a double bevel ring disposed between the synchronizing rings, freely rotatable relative to the hub and frictionally gripped between the rings when the cone clutch is engaged, is assembled by a device comprising mounting stops for the outer synchronizing ring, the mounting stops being axially fixed with respect to the hub and distributed over the periphery thereof, a mounting stamp for axially loading the inner friction ring, means for axially loading the mounting stamp, means for controlling the loading means, and a load-sensing means for sensing the axial bias of the cone clutch, the load-sensing means being arranged between the outer synchronizing ring and at least one of the mounting stops, and the controlling means being responsive to the axial bias sensed.

4 Claims, 1 Drawing Sheet

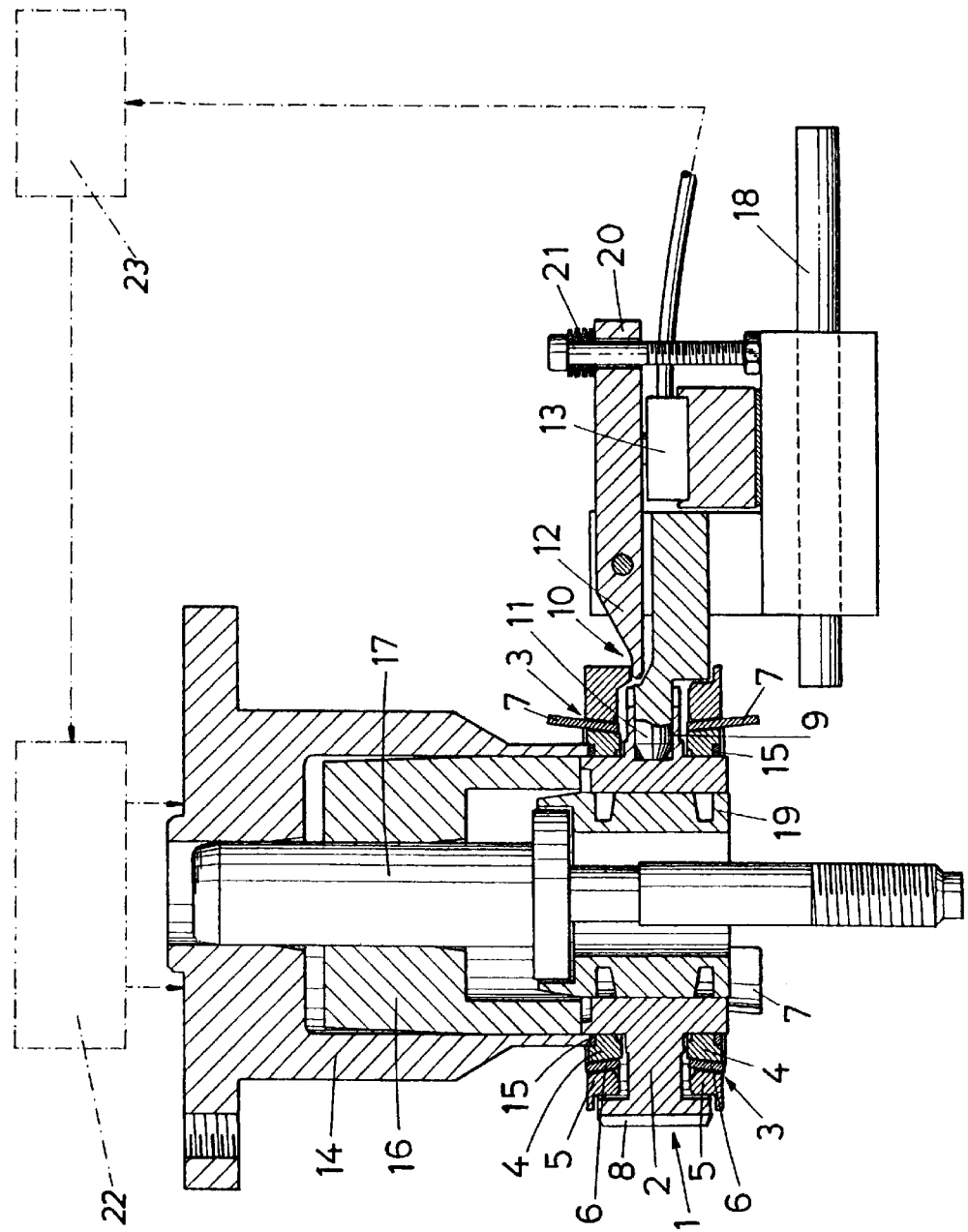

DEVICE FOR ASSEMBLING A SYNCHRONIZER FOR A CHANGE-SPEED GEAR

BACKGROUND OF THE INVENTION

1. Field of the Invention

This invention relates to a device for assembling a synchronizer for a change-speed gear, comprising a hub with a sliding sleeve and at least one cone clutch with a double bevel ring, which is freely rotatable with respect to the hub, between an inner friction ring connectable with the hub and an outer synchronizer ring axially movable with respect to the friction ring by the sliding sleeve, where there are provided mounting stops for the outer synchronizer ring, which are axially fixed with respect to the hub and distributed over the periphery thereof, and a mounting stamp for axially loading the inner friction ring of the cone clutch.

2. Description of the Prior Art

To ensure that in the case of change-speed gears with a hub fixedly mounted on a shaft and a gearwheel freely rotatable on the shaft, the hub can easily be connected with the gear-wheel via a dog clutch, which is formed by a sliding sleeve axially movable on the hub and adapted to be pushed onto a collar on the side of the gearwheel, the gearwheel must take on the rotational speed of the hub. This is achieved by a cone clutch provided between the hub and the gearwheel, which has a double bevel ring effecting a rotational entrainment of the gearwheel, which double bevel ring can be frictionally clamped between an inner friction ring fixedly connected with the hub and a synchronizer ring axially movable with respect to this friction ring by the sliding sleeve. When the sliding sleeve is moved on the hub in the sense of a clutch engagement, the axial entrainment of the synchronizer ring effects an acceleration of the double bevel ring frictionally clamped between the inner friction ring and the outer synchronizer ring, and thus of the gearwheel fixedly connected with the synchronizer ring to the rotational speed of the hub, which provides for the subsequent unimpeded clutch engagement between the sliding sleeve and the collar of the gearwheel. For a rather backlash-free actuation of the cone clutch via the sliding sleeve it is necessary that the axial clearance required for the free running of the double bevel ring be kept as small as possible. For this purpose it is known from U.S. Pat. No. 5,613,289 to define this axial clearance by means of hub-side mounting stops for the synchronizer ring. Provided that the synchronizer ring, the double bevel ring and the inner friction ring engage in each other without any clearance, it is thus possible in the stop position of the synchronizer ring to define the axial position of the inner friction ring on the hub for the clearance determined by this mounting stop. However, the axial frictional forces occurring during the assembly of the synchronizer and the elastic bending behavior of the individual parts of the cone clutch in axial direction must be taken into account during the axial fixation of the inner friction ring on the hub. For this reason, the cone clutch is urged under a bias against the hub-side mounting stops by means of a mounting stamp with a predetermined axial force, where by means of the substantially frictionless movability of the inner friction ring on the hub it is ensured that the bias acting on the cone clutch is indeed determined only by the applied axial force and is not influenced by the axial friction forces between the inner friction ring and the hub, as this would for instance be the case when pressing the inner friction ring onto the hub. For the axial fixation of the friction ring on the hub there is advantageously used a fastening ring, which in the warm condition is mounted on the hub with a radial clearance and is then cooled so as to achieve a shrink fit. Via this fastening ring, the mounting stamp can thus also press onto the inner friction ring, until the warm fastening ring has cooled sufficiently for a corresponding shrink fit.

The bias of the cone clutch during the assembly of the synchronizer in addition provides for checking the assembly, when after the axial fixation of the inner friction ring on the hub the synchronizer ring is rotated before the removal of the mounting stop, with the external axial force having been eliminated, and the torque required for the rotation is determined as a measure for the actual bias of the cone clutch. Although by means of this known assembly method very close tolerances can be maintained even under the conditions of a mass production, the easy practicability of this method depends on whether the axial bias of the cone clutch can be applied via the fastening ring without any major frictional forces between the hub and the fastening ring, which excludes for instance a press fit of the fastening ring on the hub.

SUMMARY OF THE INVENTION

It is therefore the object underlying the invention to provide a device for assembling a synchronizer for a change-speed gear as described above such that for assembly purposes the cone clutch can be subjected to a predetermined bias, independent of frictional forces that must at best additionally be overcome by the mounting stamp.

This object is solved by the invention in that between the outer synchronizer ring of the cone clutch and at least one of the mounting stops there is provided a load-sensing means controlling the loading of the mounting stamp.

With this load-sensing means, preferably a load cell, there is measured the direct axial load acting on the outer synchronizer ring of the cone clutch independent of the axial force applied via the mounting stamp, so that by means of this load-sensing means the loading of the mounting stamp can be controlled to ensure a predetermined axial bias of the cone clutch, and even if the axial fixation of the inner friction ring with respect to the hub is effected by a fastening ring pushed onto the hub by means of a press fit, where the assembly of said fastening ring of course requires a larger stamp force, which depends on the friction between the fastening ring and the hub, than is required for merely biasing the cone clutch. The fixation of the friction ring on the hub by means of a fastening ring pressed onto the same can therefore be effected at the same time as the application of the bias of the cone clutch required for maintaining a small clearance, which ensures particularly simple assembly conditions. Other types of fixation may, however, also be provided for the friction ring of the cone clutch. Independent of the respectively chosen type of fixation, the proper assembly can easily be monitored via the load-sensing means, because after the assembly and before the removal of the mounting stops with the mounting stamp lifted off, the cone clutch should have a certain bias.

Because of the size of usual load cells, it is generally difficult to support the outer synchronizer ring directly on the load cell. To avoid this difficulty, the mounting stop provided with the load-sensing means may carry a supporting lever for the synchronizer ring, which is supported by the load-sensing means. In this case, the load-sensing means is loaded via the supporting lever, which not only creates sufficient mounting space for the load-sensing means, but also involves the additional advantage of a corresponding load transmission. To protect the load-sensing means against an overload without impairing the measurements, the supporting lever can be two-armed in accordance with a further aspect of the invention, and load the load-sensing means by means of a spring bias directed opposite to the load applied by the synchronizer ring. With this measure, the load-sensing means is loaded with an admissible maximum force as a result of the spring bias and is relieved with increasing bias of the cone clutch, because the axial load acting on the clutch is directed opposite to the spring bias of the supporting lever.

When it can be assumed that all mounting stops are uniformly loaded, one load-sensing means in the vicinity of a single mounting stop may be sufficient. When load-sensing means are provided for at least two of the mounting stops, there can not only be monitored the coaxial arrangement of the cone clutch with respect to the hub, but the cone clutch can also be monitored for component defects.

BRIEF DESCRIPTION OF THE DRAWING

In the drawing, the subject-matter of the invention is represented by way of example, and there is shown an inventive device for assembling a synchronizer for a change-speed gear in a simplified axial section.

DETAILED DESCRIPTION OF THE PREFERRED EMBODIMENT

The illustrated synchronizer 1 is provided with two cone clutches 3 disposed on both sides of its hub 2, which cone clutches each comprise an inner friction ring 4, an outer synchronizer ring 5 and a double bevel ring 6 between the friction ring 4 and the synchronizer ring 5. While the inner friction ring 4 and the outer synchronizer ring 5 are associated to the hub 2, the double bevel ring 6 has axially protruding lugs 7 for a gearwheel of a change-speed gear. This gearwheel can be connected with the hub 2 via an engaging and disengaging dog clutch, which consists of a sliding sleeve axially movable on the hub 2 and a collar associated to the gearwheel for accommodating the sliding sleeve. The sliding sleeve, which in general is adjusted by means of a shifter fork, is supported on a collar 8 formed by the hub 2 and can be axially fixed with respect to the same by means of a spring catch. For this purpose, spring-loaded ball notches can be mounted in radial bores 9 distributed over the periphery of the collar 8, which ball notches cooperate with corresponding counter-notches of the sliding sleeve.

To be able to smoothly push the sliding sleeve onto the collar of the respective gearwheel of the change-speed gear, a correspondence of the rotational speed of the sliding sleeve and of the gearwheel to be driven must be ensured. The necessary drive of the gearwheel is effected by the associated cone clutch 3, whose synchronizer ring 5 is entrained in the case of an axial adjustment of the sliding sleeve, so that the double bevel ring 6 is frictionally clamped between the inner friction ring 4 rotating with the hub 2 and the synchronizer ring 5, and is accelerated to the rotational speed of the hub 2. For this purpose it is necessary that the inner friction ring 4 is axially fixed on the hub 2 such that for the synchronizer ring 5 there is only a closely restricted setting range of for instance <0.1 mm.

To ensure such a small backlash of the cone clutch 3 during the assembly of the synchronizer 1, mounting stops 10 determining this backlash are provided on the side of the hub, against which mounting stops the synchronizer ring 5 of the cone clutch 3 is urged by an axial force acting on the inner friction ring 4. This axial force produces a bias of the cone clutch 3 compensating any backlash, so that the axial position of the inner friction ring 4 on the hub 2 can be determined with great accuracy for the axial clearance to be adjusted for the synchronizer ring 5, when it is ensured that the cone clutch 3 is loaded with a predetermined axial force. For this purpose, the mounting stops 10 distributed over the periphery of the hub 2, of which only one is represented for reasons of clarity, form a plug projection 11, which can be introduced into the bores 9 of the hub 2, and a supporting lever 12, which is supported on a load-sensing means 13, preferably a load cell, and against which the synchronizer ring 5 rests, so that the axial bias of the cone clutch 3, which has been applied by a sleeve-like mounting stamp 14, can precisely be determined by the load-sensing means 13. For this purpose, control 23 is connected to means 22 for axially loading mounting stamp 14, and load-sensing means 13 is connected to control 23 to receive a signal corresponding to the axial bias sensed by the load-sensing means. This signal is compared in control 23 with a desired predetermined axial bias stored in the control, and the axial bias exerted by means 22 for loading mounting stamp 14 is controlled by keeping the sensed axial bias equal to the desired predetermined axial bias. The load acting on the mounting stamp 14 can thus be controlled via the load-sensing means 13 such that a predetermined axial bias of the cone clutch 3 is precisely maintained. With this bias of the cone clutch 3, the inner friction ring 4 can be fixed with respect to the hub 2. In the illustrated embodiment, there is used a fastening ring 15, which is pressed onto the hub 2 by means of the mounting stamp 14 via an auxiliary cone 16, so that the press fit of the fastening ring 15 on the hub 2 ensures the axial fixation of the friction ring 4. The axial pressing force, which is required for pressing the fastening ring 15 onto the hub 2 and exceeds the axial force for biassing the cone clutch 3, is not sensed by the load-sensing means 13. When after such axial fixation of the inner friction ring 4 of the cone clutch, the mounting stamp 14 is lifted off from the cone clutch 3, the proper fit of the fastening ring 15 can be checked via the remaining bias, and possibly occurring component defects can be recognized, when the bias of the cone clutch 3 measured after lifting off the mounting stamp 14 does not fall below a predetermined value.

The mounting stops 10 are radially adjustably supported on guideways 18 disposed radially with respect to an axial guiding pin 17, so as to be able to introduce the plug projections 11 into the bores 9 of the hub 2, which is thus held axially by means of the plug projections 11. Centering the hub 2 is effected by the guiding pin 17 and a guiding sleeve 19 coaxial to the guiding pin 17. Via the guideways 18, the axial loading of the hub 2 by the mounting stamp 14 is therefore removed.

To prevent an overloading of the load-sensing means 13 of the individual mounting stops, each supporting lever 12 is designed as two-armed lever, which with its lever arm 20 facing away from the synchronizer ring 5 is supported on a compression spring 21 loading the supporting lever 12 against the load applied by the mounting stamp 14, so that the load-sensing means 13 is loaded by the spring 21 and relieved by the mounting stamp 14 against the force of the spring 21. The measure of the relief corresponds to the bias of the cone clutch 3. As a result of this arrangement an overloading of the load-sensing means 13 by the loading of the mounting stamp 14 is excluded. The spring 21 determines the maximum loading of the load-sensing means 13.

The axial fixation of the inner friction ring 4 of the cone clutch 3 on the hub 2 need not be effected via the illustrated fastening ring 15. There might for instance also be provided a fastening nut to be screwed onto the hub. The axial bias of the cone clutch 3 for maintaining a predetermined axial clearance of the synchronizer ring 5 can always be ensured via the load-sensing means 13 independent of the axial fixation of the friction ring 4.

What is claimed is:

1. In a device for assembling a synchronizer for a gear change box, which synchronizer comprises (a) a hub, (b) a sleeve axially slidably mounted on the hub, (c) at least one cone clutch comprising (1) an inner friction ring axially coupled to the hub, (2) an outer synchronizing ring axially displaceable relative to the inner friction ring by the axially slidable sleeve to engage and disengage the at least one cone clutch, and (3) a double bevel ring disposed between the inner friction ring and the outer synchronizing ring, the double bevel ring being freely rotatable relative to the hub and being arranged to be frictionally gripped between the inner friction ring and the outer synchronizing ring when the at least one cone clutch is engaged, and which device comprises (d) mounting stops for the outer synchronizing ring of the cone clutch, the mounting stops being axially fixed with respect to the hub and distributed over the periphery thereof, and (e) a mounting stamp for axially loading the inner friction ring of the at least one cone clutch, and (f) means for axially loading the mounting stamp, the improvement comprising means for controlling the means for axially loading the mounting stamp, and a load-sensing means for sensing the axial bias of the at least one cone clutch, the load-sensing means being arranged between the outer synchronizing ring and at least one of the mounting stops, and the controlling means being responsive to the axial bias sensed by the load-sensing means.

2. In the device of claim 1, the improvement further comprising a supporting lever for the outer synchronizing ring, the supporting lever being carried by the at least one mounting stop and being supported by the load-sensing means.

3. In the device of claim 2, a spring means arranged to apply a load to the load-sensing means in a direction opposite to the axial bias applied to the outer synchronizing ring.

4. In the device of claim 1, a respective one of the load-sensing means being arranged between the outer synchronizing ring and at least two of the mounting stops.

* * * * *

UNITED STATES PATENT AND TRADEMARK OFFICE
CERTIFICATE OF CORRECTION

PATENT NO. : 5,966,802
DATED       : October 19, 1999
INVENTOR(S) : Sonntage, et. al.

It is certified that error appears in the above-identified patent and that said Letters Patent is hereby corrected as shown below:

Title page, item [73], Assignee: change the name of the Assignee to read -- Miba Sintermetall Aktiengesellschaft--.

Signed and Sealed this

Twenty-fifth Day of July, 2000

Attest:

Q. TODD DICKINSON

*Attesting Officer*      *Director of Patents and Trademarks*